United States Patent [19]

Takatsu et al.

[11] Patent Number: 5,208,273

[45] Date of Patent: May 4, 1993

[54] RUBBER COMPOSITION AND ITS APPLICATION

[75] Inventors: Sumio Takatsu, Nishinomiya; Kiyoshige Muraoka, Kobe, both of Japan

[73] Assignee: Sumitomo Rubber Industries, Limited, Hyogo, Japan

[21] Appl. No.: 603,322

[22] Filed: Oct. 25, 1990

[30] Foreign Application Priority Data

Oct. 26, 1989 [JP] Japan ............................ 1-279185

[51] Int. Cl.$^5$ ................................................. C08K 3/16
[52] U.S. Cl. ....................... 523/152; 524/436; 152/208; 152/209 R; 152/211
[58] Field of Search ............. 523/152; 152/208, 209 R, 152/211; 524/436

[56] References Cited

U.S. PATENT DOCUMENTS

| | | | |
|---|---|---|---|
| 2,274,855 | 3/1942 | Wallace | 152/209 R |
| 2,582,701 | 1/1952 | Iknayan | 152/211 |

FOREIGN PATENT DOCUMENTS

| | | | |
|---|---|---|---|
| 545155 | 8/1957 | Canada | 152/211 |
| 2306345 | 8/1974 | Fed. Rep. of Germany | 152/288 |
| 2503709 | 8/1976 | Fed. Rep. of Germany | 152/208 |
| 63-262293 | 10/1988 | Japan . | |
| 2-077305 | 3/1990 | Japan . | |

Primary Examiner—Paul R. Michl
Assistant Examiner—John J. Guarriello
Attorney, Agent, or Firm—Birch, Stewart, Kolasch & Birch

[57] ABSTRACT

The present invention provides a rubber composition which is useful for the treads of studless tires which provides improved grip properties on frozen roads and preserves good performance after being used for a long period of time. The rubber composition of the present invention comprises a base rubber and an inorganic halide which has a melting point of 180° C. or more, an average particle size of 20 to 600 micrometer and a solubility of 5 g or more in 100 g of water at 0° C.; said inorganic halide being present in an amount of 3 to 35 parts by weight based on 100 parts by weight of said base rubber.

5 Claims, No Drawings

RUBBER COMPOSITION AND ITS APPLICATION

FIELD OF THE INVENTION

The present invention relates to a rubber composition. More particularly, the present invention relates to a rubber composition suitable for tire treads which are used when driving on snow and ice.

BACKGROUND OF THE INVENTION

There are spike tires and studless tires as tires for driving on snow, ice and other slippery roads.

The spike tires have advantages in slip resistant properties on frozen roads, but, when driving on paved roads, cause wear to occur in the road surface and cause serious problems of dust pollution. Recently the use of spike tires has become limited.

Concerning the studless tires, some improvements have been made on the low temperature properties of tread rubber to obtain similar good grip properties to the spike tires. However even improved studless tires are poor especially on frozen roads.

SUMMARY OF THE INVENTION

The present invention provides a rubber composition which is useful for the treads of studless tires which provide improved gripping properties on frozen roads and preserve good performance after being used for a long period of time. The rubber composition of the present invention comprises a base rubber and an inorganic halide which has a melting point of 180° C. or more, an average particle size of 20 to 600 micrometer and a solubility of 5 g or more in 100 g of water at 0° C.; said inorganic halide being present in an amount of 3 to 35 parts by weight based on 100 parts by weight of said base rubber.

DETAILED DESCRIPTION OF THE INVENTION

The inorganic halide is present in a crystalline state in the rubber composition and vulcanized therewith. The inorganic halide crystals are exposed by the wearing of the tread formed from the vulcanized rubber. The exposed crystals and scratch the ice surface thereby acting as spikes for the tires. The inorganic halide crystals thereafter drop from the tire or dissolve in water on the roads, leaving many hollows on the tread which enhance the frictional properties thereof.

The inorganic halide employed in the present invention has a melting point of 180° C. or more. If the melting point is less than 180° C., the inorganic halide fuses when the rubber composition is vulcanized and does not function as mentioned above. It is also required that the inorganic halide also has a solubility of 5 g or more in 100 g of water at 0° C. If the solubility is less than 5 g, the inorganic halide does not dissolve in water and may cause dust pollution. The average particle size of the inorganic halide is within the range of 20 to 600 micrometer, preferably 100 to 300 micrometer. Average particle sizes of less than 20 micrometer do not obtain the spike effect and particle sizes of more than 600 micrometer deteriorate the tensile strength of the vulcanized rubber. Typical examples of the inorganic halides which can be used in the present invention include sodium chloride, potassium chloride, sodium bromide, potassium bromide and the like.

The base rubber employed in the present invention can be any rubber which is used in this field, but includes, e.g., natural rubber, synthetic polyisoprene, high-cis-1,4-polybutadiene, styrene-butadiene rubber, and a mixture thereof, and the like.

The inorganic halide is generally present in the rubber composition in an amount of 3 to 35 parts by weight, preferably 15 to 25 parts by weight, based on 100 parts by weight of the base rubber. Amounts of less than 3 parts by weight do not obtain the spike effects and those of more than 35 parts by weight cause deterioration in the other physical properties of the rubber (e.g. tensile strength).

The rubber composition of the present invention may contain other ingredients which are formulated into the rubber composition, for example a vulcanizer (e.g. sulfur), a vulcanization assistant (e.g. stearic acid and zinc oxide), an antioxidant (e.g. N-isopropyl-N-phenyl-p-phenylenediamine), a vulcanization promoter (e.g. N-cyclohexyl-2-banzothiazylsulphenamide), carbon black, a process oil (e.g. an aromatic oil) and the like.

The rubber composition of the present invention is generally prepared by sufficiently mixing the above mentioned ingredients. The rubber composition is very suitable for tire treads. The rubber composition is generally vulcanized at 150° to 190° C. for 3 to 480 minutes to form the tire treads.

The inorganic halide crystals in the tire treads are exposed by wearing and thus scratch the frozen road surface so as to act in the same manner as spikes of spike tires, because the inorganic halide crystals are harder than the tread rubber. The inorganic halide crystals thereafter drop off or dissolve in water on the roads and form many hollows or holes, creating a rough surface on the tread which enhances the frictional properties and improves the slip properties on ice.

The hollows formed by the dropping off or dissolving of the inorganic halide crystals have different shapes from those of ordinary foamed rubber, for example having rectangular parallelopiped and other polygonal shapes. Since some of the inorganic halides, i.e. sodium chloride and potassium chloride, are generally used as a snowmelting agent, the dropped and dissolved inorganic halides often exhibit a similar snowmelting effect.

EXAMPLES

The present invention is illustrated by the following examples which, however, are not to be construed as limiting the scope of the present invention.

Examples 1 to 6 and Comparative Examples 1 and 2

A rubber composition was prepared by mixing the ingredients shown in Table 1 and vulcanizing these ingredients at 175° C. for 15 minutes to obtain a tire tread, followed by obtaining a tire having a 165 SR 13 size. The tire was subjected to the following tests and the results are shown in Table 1.

Friction Index of a Vulcanized Sample Tip on Ice

Test place; Frozen road test course in Hokkaido
Ice surface temperature; $-3°$ to $-2°$ C.
Test process; Using a dynamic friction tester available from Sanko Co., Ltd., a friction coefficient was determined at breaking from 40 Km/h and expressed with an index of Comparative Example being 100.

Ice Surface Test of Tires

Test place; Frozen road test course in Hokkaido

Ice surface temperature; −3° to −2° C.
Test car; FF 1,500 cc Japanese car

Rim; 5J X 13
Inside pressure; 1.9 Kg/cm²
Test process; A friction coefficient was calculated from a locked breaking distance at a speed of 30 Km/h and expressed with a relative amount as Comparative Example 1 being 100.

Tensile Strength

The ingredients shown in Table 1 were mixed and rolled to form a rubber composition roll which was then vulcanized at 170° C. for 15 minutes to obtain rubber plate. A JIS dumbbel specimen was formed from the rubber plate and the tensile strength was determined using an intest universal material testing machine. In Table 1, it was expressed with an index of Comparative Example 1 bing 100.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  | Examples |  |  |  |  | Com. Ex. |  |
|---|---|---|---|---|---|---|---|
|  | 1 | 2 | 3 | 4 | 5 | 1 | 2 |
| Natural rubber | 60 | 60 | 60 | 60 | 60 | 60 | 60 |
| Polybutadiene | 40 | 40 | 40 | 40 | 40 | 40 | 40 |
| ISAF | 65 | 65 | 65 | 65 | 65 | 65 | 65 |
| Oil | 36 | 36 | 36 | 36 | 36 | 36 | 36 |
| Wax | 2 | 2 | 2 | 2 | 2 | 2 | 2 |
| Antioxidant | 1.5 | 1.5 | 1.5 | 1.5 | 1.5 | 1.5 | 1.5 |
| Stearic acid | 2 | 2 | 2 | 2 | 2 | 2 | 2 |
| Zinc oxide | 3 | 3 | 3 | 3 | 3 | 3 | 3 |
| NaCl (average particle size 400 μm) | 5 | 15 | 30 | — | — | — | 40 |
| NaCl (average particle size 200 μm) | — | — | — | 15 | — | — | — |
| KCl (average particle size 100 μm) | — | — | — | — | 15 | — | — |
| Sulfur | 1.5 | 1.5 | 1.5 | 1.5 | 1.5 | 1.5 | 1.5 |
| Vulcanization promotor | 1 | 1 | 1 | 1 | 1 | 1 | 1 |
| Tensile strength | 98 | 94 | 90 | 94 | 95 | 100 | 78 |
| Friction index of a vulcanized sample tip on ice | 102 | 122 | 124 | 124 | 130 | 100 | 126 |
| Ice surface test of tires | 105 | 107 | 108 | 109 | 114 | 100 | 110 |
| Traction max. μ | 108 | 118 | 119 | 120 | 124 | 100 | 120 |
| Traction ave. μ | 106 | 118 | 118 | 119 | 123 | 100 | 119 |

What is claimed is:

1. A rubber composition for tire treads comprising a base rubber and an inorganic halide in crystalline form contained therein, said inorganic halide having a melting point of at least 180° C., an average particle size of 20 to 600 micrometer and a solubility of at least 5 g in 100 g of water at 0° C.; said inorganic halide being present in an amount of 3 to 35 parts by weight based on 100 parts by weight of said base rubber.

2. The rubber composition according to claim 1 wherein said inorganic halide is selected from the group consisting of sodium chloride and potassium chloride.

3. The rubber composition according to claim 1 wherein said base rubber is selected from the group consisting of natural rubber, synthetic polyisoprene, high-cis-1,4-polybutadiene and styrene-butadiene rubber.

4. The rubber composition according to claim 1 wherein said rubber composition further contains a vulcanizer, a vulcanization assistant, an antioxidant, a vulcanization promoter, carbon black and a process oil.

5. A tire tread prepared by vulcanizing the rubber composition according to claim 1.

* * * * *